Figure 1:
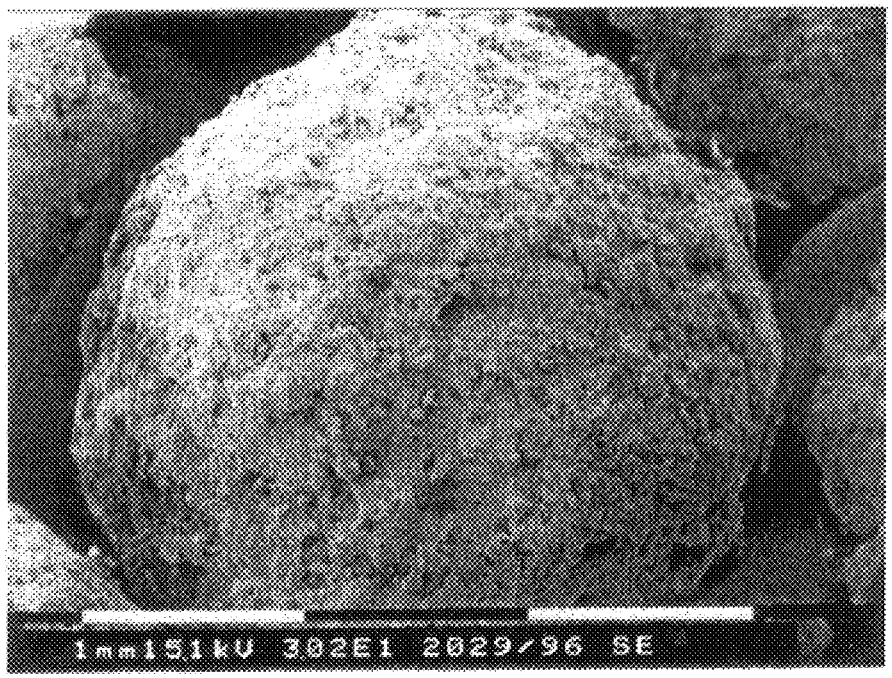
Figure 2:
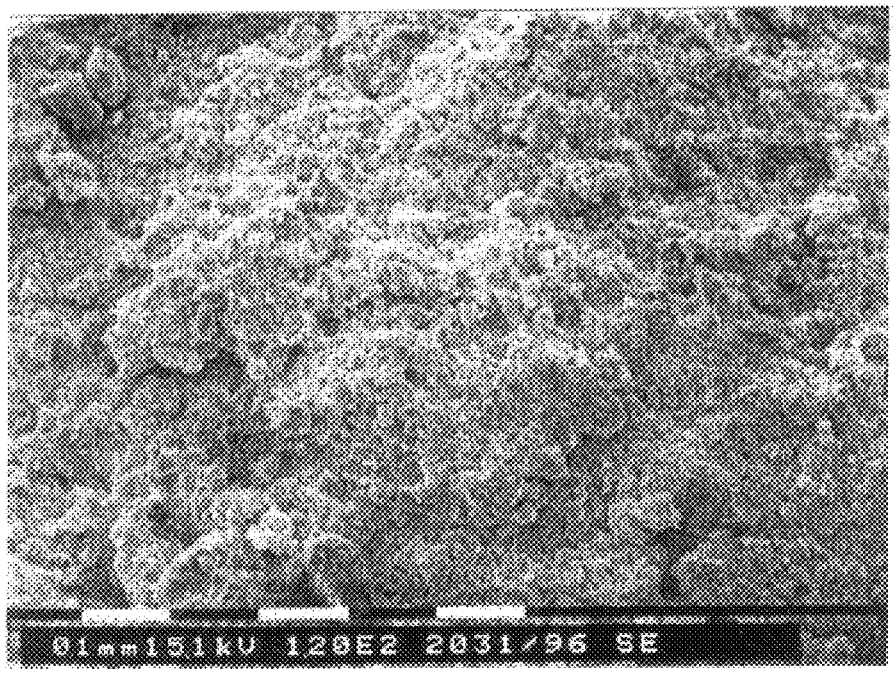
Figure 3:
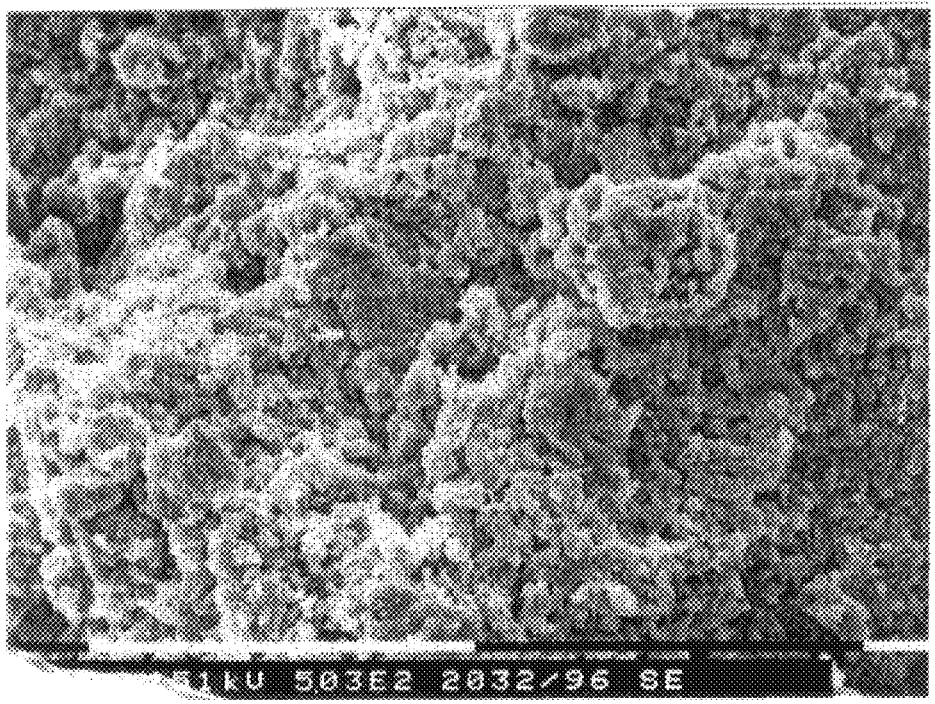
Figure 4:
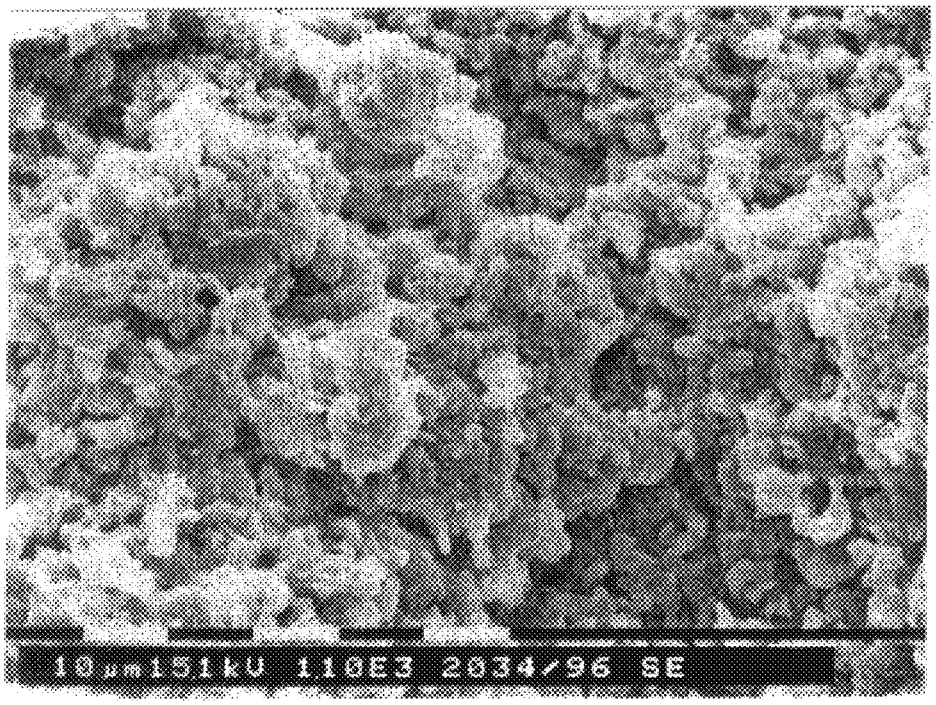
Figure 5:
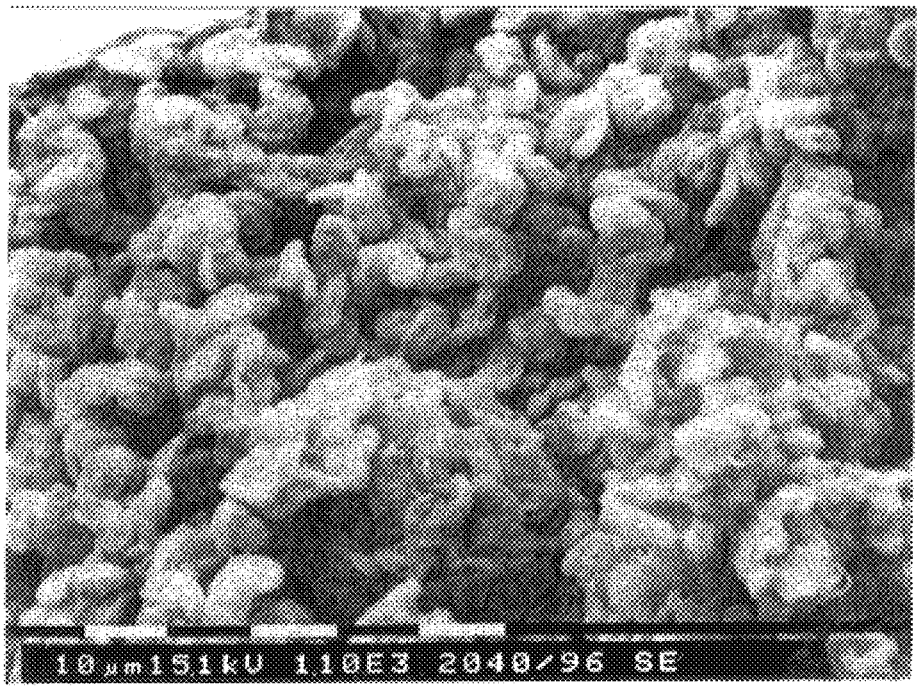
Figure 6:
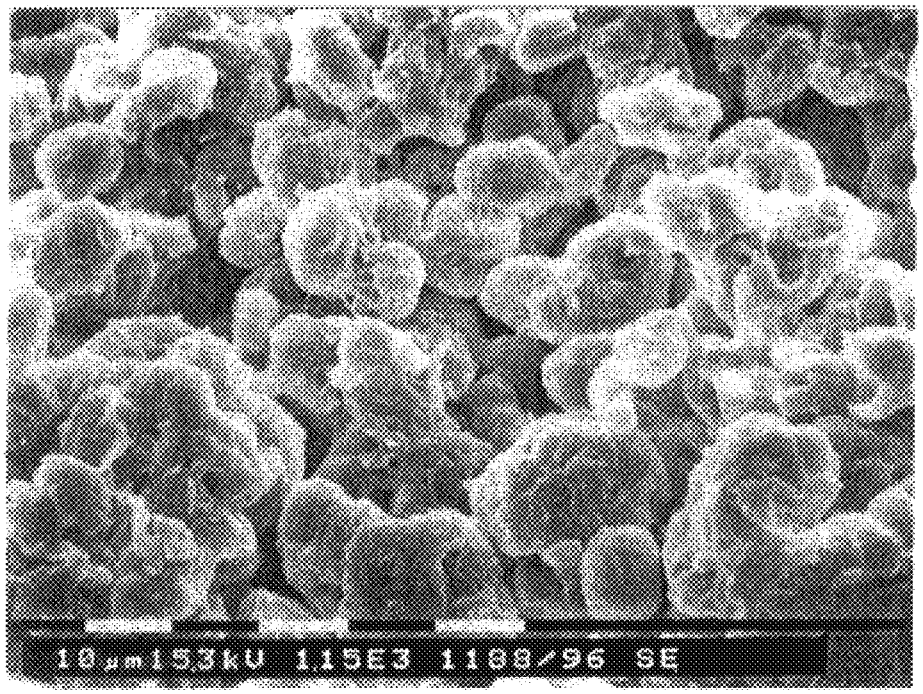

United States Patent [19]
Tabaksblat et al.

[11] Patent Number: 6,051,618
[45] Date of Patent: Apr. 18, 2000

[54] PROCESS FOR THE PREPARATION OF POROUS POLYOLEFIN PARTICLES

[75] Inventors: Ronald Tabaksblat, Maastricht; Hendricus F. Aussems, Heerlen, both of Netherlands

[73] Assignee: DSM N.V., Te Heerlen, Netherlands

[21] Appl. No.: 09/092,141

[22] Filed: Jun. 5, 1998

Related U.S. Application Data

[63] Continuation of application No. PCT/NL96/00452, Nov. 15, 1996.

[30] Foreign Application Priority Data

Dec. 6, 1995 [BE] Belgium .................................. 9500999

[51] Int. Cl.$^7$ ....................................................... C08J 9/28
[52] U.S. Cl. ................................................. 521/60; 521/64
[58] Field of Search ......................................... 521/60, 64

[56] References Cited

U.S. PATENT DOCUMENTS

| | | | |
|---|---|---|---|
| 3,308,073 | 3/1967 | Kepple | 521/64 |
| 3,536,796 | 10/1970 | Rock | 521/64 |
| 3,696,061 | 10/1972 | Selsor et al. | 521/64 |
| 3,954,927 | 5/1976 | Duling | 521/64 |
| 4,247,498 | 1/1981 | Castro . | |
| 4,519,909 | 5/1985 | Castro . | |
| 4,673,695 | 6/1987 | Aubert et al. . | |
| 4,726,989 | 2/1988 | Mrozinski . | |
| 4,935,365 | 6/1990 | Nilsson et al. . | |
| 5,221,651 | 6/1993 | Sacchetti et al. . | |
| 5,231,119 | 7/1993 | Govoni et al. . | |
| 5,236,962 | 8/1993 | Govoni et al. . | |

FOREIGN PATENT DOCUMENTS

| | | |
|---|---|---|
| 370260 | 5/1990 | European Pat. Off. . |
| 519342 | 12/1992 | European Pat. Off. . |
| 2226320 | 6/1990 | United Kingdom . |

*Primary Examiner*—Morton Foelak
*Attorney, Agent, or Firm*—Pillsbury Madison & Sutro LLP

[57] ABSTRACT

The invention relates to a process for the preparation of porous polyolefin particles, which process comprises the following steps:

1) dissolution of at least one crystallizable polyolefin in a solvent, which results in a solution being formed which comprises 0.1–50 wt. % polyolefin, and the initial polyolefin solution formed containing between 5 ppm and 20 wt. % of nucleating agent,
2) dispersion of the resulting polyolefin solution in a non-solvent, at a temperature that is higher than the crystallization temperature of the polyolefin in the polyolefin solution, upon which a multiphase system is formed,
3) cooling of the multiphase system, with simultaneous stirring, the cooling rate being between 0.05 and 10° C./min, down to a temperature which is below the crystallization temperature of the polyolefin in the polyolefin solution, so that strong, polyolefin-containing particles are formed,
4) separation of the polyolefin-containing particles from the liquid(s),
5) drying of the polyolefin-containing particles at a temperature that is below the crystallization temperature of the polyolefin in the initial polyolefin solution.

15 Claims, 3 Drawing Sheets

SEM picture of a porous polyolefin particle, magnification 30x

SEM picture of a porous polyolefin particle, magnification 120x

SEM picture of a porous polyolefin particle, magnification 500x

SEM picture of a porous polyolefin particle, magnification 1100x

SEM picture of a porous polyolefin particle, magnification 1100x

SEM picture of a porous polyolefin particle, magnification 1150x

PROCESS FOR THE PREPARATION OF POROUS POLYOLEFIN PARTICLES

This is a Continuation of International Appln. No. PCT/NL96/00452 filed Nov. 15, 1996 which designated the U.S.

The invention relates to a process for the preparation of porous polyolefin particles.

A process for the preparation of porous polymer particles is known from EP-A-0370260. In this process a large number of different liquids is needed for preparation of the porous polymer particles. In the first place, a mixture of (at least) two liquids is needed to dissolve the polymer, for which a high temperature is required. A homogeneous polymer solution is then formed. Subsequently, a third liquid, a warm, inert dispersion agent, is added to the polymer solution obtained. This yields a two-phase system. This two-phase system is stirred strongly, so that drops of the polymer solution are formed. Then a fourth, cool, inert liquid is used. The drops are collected and finally an extraction step takes place. For the extraction at least a fifth liquid is required. In a number of cases extraction must be followed by washing with yet another (at least sixth) liquid, as appears from Example 11. As the known process requires the use of a large number of liquids, on an industrial scale it produces a large number of effluent streams, which need to be purified. From an environmental point of view this process is unsatisfactory, and therefore there is a need for a better process.

The aim of the invention is to provide a process for the preparation of porous polyolefin particles in which the above-mentioned drawback is eliminated or partly eliminated. This aim is achieved in that the process comprises the following steps:

1) dissolution of at least one crystallizable polyolefin in a solvent, which results in a solution being formed which comprises 0.1–50 wt. % polyolefin, and the initial polyolefin solution formed containing between 5 ppm and 20 wt. % of nucleating agent,
2) dispersion of the resulting polyolefin solution in a non-solvent, at a temperature that is higher than the crystallization temperature of the polyolefin in the polyolefin solution, upon which a multiphase system is formed,
3) cooling of the multiphase system, with simultaneous stirring, the cooling rate being between 0.05 and 10° C./min, down to a temperature which is below the crystallization temperature of the polyolefin in the polyolefin solution, so that strong, polyolefin-containing particles are formed,
4) separation of the polyolefin-containing particles from the liquid(s),
5) drying of the polyolefin-containing particles at a temperature that is below the crystallization temperature of the polyolefin in the initial polyolefin solution.

Thus it is achieved that in the process according to the invention fewer (different) liquids are needed on an industrial scale, which has as a direct consequence that fewer effluent streams need to be purified and the process can be carried out more simply than the process as described in EP-A-02370260. In addition, in the process according to the invention the risk of the porous polyolefin prepared carrying the odour of one or more of the liquids is smaller. Moreover, the process of the present invention appears to have an advantage in that the dimensions of the porous polyolefin particles and the pore size are better controllable. Another advantage is that the dimensions of the porous polyolefin particles prepared exhibit a less high spread than in the state of the art.

It is true that EP-A-0644230 discloses a process for the preparation of polymer particles with controllable dimensions, but it does not give any clue as to how porous polymer particles should be prepared.

The porous polyolefin particles obtained by use of the process according to the invention can be prepared using a wide variety of polyolefins. Not only homopolymers are suitable, use can also be made of copolymers. The term copolymers is understood to mean those polymers which contain two or more different monomers. Within the scope of the invention it is also possible to use mixtures of different polyolefins.

For the polyolefins use can be made of, for example, entirely freshly made polyolefins, polyolefins obtained after reprocessing of used materials, for example in the framework of recycling, polyolefins collected as production rejects and production waste, contaminated polyolefins and polyolefins that do not satisfy the predetermined product requirements, the so-called off-spec products.

Suitable polyolefins for use in the process according to the invention are, for example, polyethylene, polypropylene, polybutene, poly(4-methyl-1-pentene), polycyclohexylethylene. Preferably, use is made of polyethylene and/or polypropylene, more preferably use is made of polyethylene. It is not critical which type of polyethylene is used in the process according to the invention. The polyethylene may for example have been prepared using processes known per se, including solution, slurry, gas-phase and high-pressure processes. Use can be made for example of ultrahigh-molecular-weight polyethylene (UHMWPE), high-density polyethylene (HDPE), linear low-density polyethylene (LLDPE), low-density polyethylene (LDPE), very-low-density polyethylene (VLDPE) and ultralow-density polyethylene (ULDPE). Preferably, use is made of LDPE or LLDPE.

LLDPE is understood to mean a substantially linear homo- or copolymer of ethylene with one or more α-olefins with 3–12 C atoms and optionally one or more non-conjugated dienes, the product having a density of 910–965 kg/m$^3$. Examples of suitable α-olefins are α-alkenes with 3–9 C atoms, in particular propylene, 1-butene, 1-hexene, 4-methyl-1-pentene and 1-octene. Examples of suitable dienes are 1,7-octadiene and 1,9-decadiene. LLDPE mainly has short side chains of 1 to 10 C atoms and substantially fewer long side chains than LDPE.

As LDPE use can for example be made of polyethylene produced in the customary manner in a high-pressure process using one or more radical initiators. The density of LDPE is lower than 935 kg/m$^3$.

If polypropylene is used, use may be made of both isotactic and syndiotactic polypropylene.

In the process according to the invention the following takes place. The polyolefin is first dissolved in a solvent. Various organic liquids may be used as solvent. The choice of the solvent will to a large extent be determined by the degree to which the solvent is capable of dissolving the polyolefin. Examples of suitable organic solvents for use in the process of the present invention are compounds from the series of n-alkanes, i-alkanes, cycloalkanes, polycyclic compounds with two or more cyclic structures, alkenes, cycloalkenes, optionally hydrogenated and/or substituted aromatics, chlorinated hydrocarbons, esters, aldehydes, alcohols, ketones, ethers, decalin, tetralin, paraffin oil or xylenes. Mixtures of these are also suitable. If polyethylene is used as polyolefin, use is preferably made of a cycloalkane or n-alkane, in particular cyclohexane, n-hexane or n-heptane.

Dissolution of the polyolefin in the solvent optionally takes place with simultaneous heating. If necessary dissolution can be accelerated by applying dynamic or static mixing. Depending on the choice of solvent, it may be advantageous to work at elevated pressure. Dissolution of the polyolefin yields a polyolefin solution.

So much polyolefin is used that the polyolefin solution formed contains between 0.1 and 50 wt. %, preferably between 1 and 30 wt. %, polyolefin. This weight percentage is calculated on the basis of the sum of the weight of the solvent and that of the polyolefin. At concentrations >50 wt. % it becomes difficult to stir the polyolefin solution; at low concentrations the process becomes less interesting from an economic point of view.

To obtain porous polyolefin particles it is necessary for the polyolefin to be crystallizable. However, it is not necessary for the polyolefin to be fully (100%) crystallizable.

Further it is necessary for between 5 ppm and 20 wt. %, preferably between 10 ppm and 10 wt. %, nucleating agent to be present in the polyolefin solution, the weight percentage being calculated on the basis of the sum of the weight of the polyolefin and that of the nucleating agent. A high concentration of nucleating agent leads to small particles, while at a low concentration of nucleating agent large particles are formed. Moreover, at a too low concentration the crystallization process is too slow to be of industrial interest. The moment of addition of the nucleating agent is not critical, provided the nucleating agent is present before the multiphase system is cooled. Preferably, the nucleating agent is added when the polyolefin solution is being prepared. The addition ode is not critical, either. The nucleating agent can be added at once, continuously, or in several portions over a certain period of time.

Preferably, the nucleating agent is selected from the series formed by silicates, mica, talc, sorbitol derivatives, saturated or unsaturated fatty acids or their salts, organic pigments or polymers with functional groups. It is also possible to add a combination of these compounds. More preferably, the nucleating agent is selected from talc, a sorbitol derivative or an oxidized polymer.

The fatty acids and their salts which are used as nucleating agent may contain 10 to 100 C atoms; examples are lauric acid, stearic acid and the mixture of alkane carboxylic acids that is known as 'Montanwachs'. The salts of the fatty acids may contain a metal ion from groups 1, 2, 11, 12, 13 and 14 of the Periodic System of the Elements, as published in the CRC Handbook of Chemistry and Physics, 70th Edition, 1989–1990. Preferably, sodium stearate, potassium stearate, calcium stearate, magnesium stearate or zinc stearate is chosen.

Polymers with functional groups based on polyolefins may for example be obtained through grafting, copolymerization or oxidation of polyolefins or by subjecting polyolefins to a surface treatment. These polymers usually have between 0.1 and 15 wt. % functional groups.

If the crystallizable polyolefin already contains enough functional groups for example as a consequence of previous treatments, it is not necessary to add an additional nucleating agent.

The resulting polyolefin solution with nucleating agent and a non-solvent are dispersed in each other, optionally with stirring or another form of dynamic or static mixing. The order in which non-solvent and polyolefin solution are added to each other to be dispersed is not critical, as long as the non-solvent remains the continuous phase in the dispersion obtained. The non-solvent is a compound in which the polyolefin does not dissolve and which is also immiscible with the polyolefin solution. For suitable solvents and non-solvents, the reader is referred to the tables as presented in Polymer Handbook, J. Brandrup and E. H. Immergut, eds., John Wiley and Sons, 3rd Ed. (1989), p. VII/379 ff. The amount of non-solvent to be used is not critical as long as the non-solvent remains the continuous phase in the dispersion obtained.

Depending on the polarity of the polyolefin, the non-solvent is a polar or apolar compound.

For a polyolefin that dissolves in an apolar solvent, a polar non-solvent will be very suitable. Suitable polar compounds for use as non-solvent are, for example, water or a compound from the group of organic or inorganic acids, ketones or alcohols. Preferably, water, acetone, methanol or ethanol are used, and more preferably use is made of water. Mixtures of these compounds are also suitable. Examples of apolar compounds that are suitable for use as non-solvent are aliphatic, alicyclic, aromatic and polycyclic hydrocarbons. Mixtures of these compounds are also suitable. The compounds may be either substituted or unsubstituted. The substituent group may consist either of only C and H atoms or of C, H and/or heteroatoms. The substituent group preferably has 3–100 C atoms.

During dispersion of the polyolefin solution in the non-solvent a multiphase system is formed, the term multiphase system being understood to mean a system comprising at least two phases, of which at least one phase contains polyolefin: the polyolefin-containing phase. During dispersion of polyolefin solution and non-solvent the temperature must be higher than the crystallization temperature of the polyolefin in the polyolefin solution.

The crystallization temperature can be determined by means of the Differential Scanning Calorimetry technique. During a Differential Scanning Calorimetry (DSC) measurement the substance is subjected to controlled heating or cooling in a controlled atmosphere, while the difference in temperature between the substance and a reference material due to energy changes in the substance is measured continuously. A transition (such as melting or crystallization) is marked by absorption or release of energy by the substance, resulting in a corresponding endothermal or exothermal peak in the DSC curve. It is possible for more than one peak to be present in the curve. Determination of the crystallization temperature of a polymer in a solvent can best be carried out by using the same solvent also during the DSC measurement. Depending on the choice of the solvent, use will be made of open or pressure-tight specimen holders. If cyclohexane is used as solvent, for example, pressure-tight specimen holders will be chosen in view of the high vapour pressure. A controlled atmosphere is obtained, for example, by the use of nitrogen or helium.

The position of the melting point or crystallization point can be affected by a number of factors, including the particle size, the heating or cooling rate or the inhomogeneity of the specimen. In the DSC measurements carried out within the scope of the invention use is made of a heating or cooling rate of 5° C./min.

As crystallization temperature the temperature is used that belongs to the point where the (DSC) crystallization curve deflects 1% from the base line, the percentage relating to the height of the maximum peak.

To control the dimensions of the drops of the polyolefin solution, which together make up the polyolefin-containing phase, it may be useful to add a surfactant to the non-solvent. The surfactant concentration is preferably 10 ppm—5 wt. %, more preferably 100 ppm—1 wt. %. The weight percentage is calculated on the basis of the sum of the weight of the non-solvent and the surfactant together. At too low a surfactant concentration the drops of the polyolefin solution may exhibit too much affinity to aggregation. However, if the surfactant concentration is too high, too many small drops of polyolefin solution may be formed, which after drying form too small particles. For the average person skilled in the art it is easy to determine the most desirable concentration by means of experiments.

The surfactant may be an anionic, cationic, non-ionic or amphoteric surfactant. Suitable surfactants are, for example, compounds from the group of alkane sulphonates, alkyl benzene sulphonates, fatty alcohol sulphonates, alkyl ammonium compounds, surfactants of the betaine type and fatty alcohol polyglycol ethers. If polyethylene is used as polyolefin, use is preferably made of an alkane sulphonate or a fatty alcohol polyglycol ether.

On account of the presence of one or more surfactants, foaming may occur. To prevent foaming, a foam inhibitor and/or a defoaming agent can be added. A combination of foam inhibiting and/or defoaming agents is also possible. These foam inhibitors and/or defoaming agents can be added in various steps of the process, but this is preferably done during dispersion.

Optionally, a portion of the solvent can be evaporated from the multiphase system formed in the process according to the invention. Whether or not evaporation is necessary will depend on the polyolefin and the solvent started from and the initial polyolefin concentration. The objective of evaporation is concentration of the polyolefin solution to such an extent that during cooling polyolefin-containing particles, also referred to as gel particles, are formed which can be processed according to the process of the present invention. The amount of solvent to be evaporated depends on the concentration of the polyolefin solution. The lower the concentration, the larger the amount that can be evaporated. Polyolefin-containing particles or gel particles are here understood to mean the particles that are separated from the multiphase system and that still contain solvent and optionally non-solvent. The need for evaporation and the degree to which such evaporation should take place can readily be established experimentally by one skilled in the art. Solvent evaporation can lead to simultaneous evaporation of a portion of the non-solvent. In a large number of cases evaporation of an azeotrope will be possible. In special cases the non-solvent may, because of the choice of the solvent and the non-solvent, have a tendency to be evaporated at lower temperatures than the solvent. If this situation arises, any deficiency in terms of the non-solvent is to be made up using fresh or recycled non-solvent. The result aimed for, an increased concentration of the polyolefin in the solvent, will then also be achieved in this manner.

The remaining multiphase system is then cooled in a controlled manner. Cooling usually takes place at a rate that is between 0.05 and 10° C./min, but preferably at a rate that is between 0.1 and 5° C./min, and in particular between 0.2 and 2° C./min. During cooling, due to crystallization, polyolefin-containing particles are formed in the multiphase system that still contain solvent and optionally non-solvent. Cooling is continued until the multiphase system has reached a temperature that is below the crystallization temperature of the polyolefin in the polyolefin solution. For further processing the polyolefin-containing particles must be strong enough to be subjected to separation and drying operations. If the temperature is still too high, the polyolefin-containing particles are too weak for proper filtration. If this is the case, deeper cooling is to be applied. If cyclohexane and/or n-heptane is used as solvent for polyethylene, cooling preferably takes place until the temperature is below 40° C. As already described, the crystallization temperature can be determined by means of the DSC technique.

During cooling stirring must be applied. Within the scope of the invention stirring is understood to mean maintaining the dispersion. When other means are able to achieve and maintain the dispersion, these means are also suitable. The particle size can be controlled depending on the type of stirrer and the speed. The higher the stirring speed (with the same type of stirrer), the smaller the porous polyolefin particles will be, and the lower the stirring speed, the larger the particles will be.

Subsequently, the polyolefin-containing particles are separated from the multiphase system. This can be done in a way known to the average person skilled in the art. Examples of suitable techniques are vacuum filtration, centrifuging and/or treatment in a filtration press; preferably, gravity-based filtration is used.

In the last step, the separated polyolefin-containing particles, still containing solvent and optionally non-solvent, are dried. Drying can be effected up to any desired degree of solvent removal. The way the drying process is effected to a major extent determines the porosity of the polyolefin particles. The drying process needed to obtain porous polyolefin particles can be carried out in various ways; thus, for example, drying can be effected at reduced pressure, the polyolefin-containing particles can be stripped using a gas or vapour, or the polyolefin-containing particles can be dried dielectrically (for example by means of microwave or RF (radio frequency) drying, as described for example in Microwave Processing and Engineering, R. V. Decareau and R. A. Peterson, ed. Ellis Horwood Ltd and VCH GmbH, 1986, or in Industrial Microwave Heating, A. C. Metaxas and R. J. Meredith, Peter Peregrinus Ltd., 1983). In these options the solvent has a reduced partial pressure.

Examples of gases that are suitable for use in the stripping process are air, nitrogen, helium, carbon dioxide and methane. Preferably, nitrogen is used as stripping gas.

Drying at reduced pressure preferably takes place under such conditions that the partial pressure of the solvent in the vapour phase is less than 50%, but more preferably less than 20%, of the standard vapour pressure of the solvent at 20° C.

The temperature during drying must be lower than the crystallization temperature of the polyolefin in the polyolefin solution. If use is made of polyethylene as polyolefin, for example, drying preferably takes place at a temperature below 30° C.

Irrespective of the type of drying process that is chosen, drying preferably takes place under such conditions that degradation of the particle structure is prevented as much as possible (for example by low force effects). Any degradation of the particle structure can simply be established in one or more experiments by one skilled in the art.

Use of the process of the present invention makes it possible to obtain porous polyolefin particles with dimensions between 0.1 and 20 mm. By way of illustration some electron microscopy (SEM) pictures of porous polyolefin particles, obtained by use of the process according to the invention, are shown in FIGS. 1 up to and including 6.

The porous polyolefin particles prepared using the process according to the invention are suitable for various applications, for example as concentrates, absorbents or carriers for substances that are to be released at a slow and/or controlled rate.

For proper dispersion of additives in a plastic is it advantageous, and sometimes necessary, to add the additives to the plastic in the form of a concentrate of the additive in a polymeric matrix. Concentrates, for example, are widely used in plastics as so-called masterbatches. For economic use of the additives it is advantageous for the additive concentration in the polymeric matrix of the masterbatch to be as high as possible. However, particularly in the case of liquid additives, it often proves impossible to effect proper dispersion of high concentrations of the additive in the polymeric matrix. Porous polyolefin particles obtained by use of the process according to the invention are eminently suitable for absorption of high concentrations of additive. If liquid additives are used, the additive can be absorbed directly. If the additive is in solid form, the additive can be melted, dissolved or dispersed in a suitable liquid before being contacted with the porous polyolefin particle. Absorption of the additive in the porous polyolefin particle can be carried out using known techniques, one suitable technique being dosing of the additive to the porous polyolefin particle in a mixer.

In another application of these porous polyolefin particles the particles can be used to effect the slow release of an active substance. To this end the active substance is first absorbed by the porous polyolefin particle, upon which the substance in question is slowly released. As examples of active substances, drugs, fragrances, insecticides, pheromones and fertilizers may be mentioned.

Furthermore, porous polyolefin particles are suitable for (selective) absorption of certain substances. Examples are the absorption of stench components, leaked and/or spilled liquids or purification of contaminated water streams, with the porous polyolefin particle absorbing the contaminants.

The invention will be explained on the basis of the following examples, without being limited thereto.

In the examples the density, d, is understood to mean the density as determined according to ASTM standard D792-66. The melt index, M.I., is determined according to ASTM standard D1238, condition E.

The DSC measurements were performed on a Perkin-Elmer DSC 7. The temperature and energy calibrations were performed on the basis of the melting of indium and lead. The temperature measurement during cooling is checked on the basis of the solid-solid transition of 4,4'-azoxy-anisole. During the measurement a heating and cooling rate of 5° C./min was used.

The porosity is determined by means of Hg porosimetry on an Autopore II 9220 supplied by Micromeritics (U.S.A.).

EXAMPLE I

In an Erlenmeyer flask 45 g of LDPE having a density of 918 kg/m$^3$ and an M.I. of 8 dg/min was dissolved in 330 g of cyclohexane at about 80° C. under reflux of the cyclohexane. 0.38 g of di-(ethyl benzylidene)sorbitol (the product NC-4 supplied by Mitsui Toatsu) was added to the solution as nucleating agent. The solution was dosed to a beaker containing 750 g of water of about 65° C., to which 0.63 g of a surfactant (an alkane sulphonate having an average chain length of 14.5 C atoms) has been added. While the mixture was being stirred, with a power input of about 200 W/m$^3$, it was dispersed for 20 minutes, upon which a portion of the cyclohexane evaporated. Subsequently, the mixture was cooled to room temperature with an average cooling rate of about 0.6° C./min. The mixture was screened, so that strong, predominantly round gel particles with a particle size of about 2–3 mm were obtained. These particles were dried in a vacuum stove at room temperature and a pressure of <100 mbar (<10$^4$ N/m$^2$). Porous polyethylene particles were formed. The porosity of the particles was 0.99 cm$^3$/g; 80% of the pores in the porous polyolefin particles had a pore radius between 0.6 and 2.2 μm.

EXAMPLE II

In an Erlenmeyer flask 54 g of LDPE having a density of 918 kg/m$^3$ and an M.I. of 8 dg/min was dissolved in 330 g of cyclohexane at about 80° C. under reflux of the cyclohexane. 0.016 g of talc (the product M-03 supplied by Finntalc) was added to the solution as nucleating agent. This mixture was dosed to a beaker containing 750 g of water of about 65° C., to which 0.57 g of a surface-active agent (an alkane sulphonate having an average chain length of 14.5 C atoms) has been added. While the mixture was being stirred, with a power input of about 200 W/m$^3$, it was dispersed for 15 minutes, upon which a portion of the cyclohexane evaporated. Subsequently, the mixture was cooled to room temperature with an average cooling rate of about 0.5° C./min. The mixture was screened, so that strong, predominantly round gel particles with a particle size of about 1–2 mm were obtained. These particles were dried in a vacuum stove at room temperature and a pressure of <100 mbar (<10$^4$ N/m$^2$). Porous polyethylene particles were formed. The porosity of the particles was 1.87 cm$^3$/g; 80% of the pores in the porous polyolefin particles had a pore radius between 0.6 and 2.2 μm.

Comparative Experiment A

In an Erlenmeyer flask 45 g of LDPE having a density of 918 kg/M$^3$ and an M.I. of 8 dg/min was dissolved in 330 g of cyclohexane at about 80° C. under reflux of the cyclohexane. This solution was dosed to a beaker containing 750 g of water of about 65° C., to which 1.5 g of a surfactant (an alkane sulphonate having an average chain length of 14.5 C atoms) has been added. No nucleating agent was present. While the mixture was being stirred, with a power input of about 200 W/m$^3$, it was dispersed for 15 minutes, upon which a portion of the cyclohexane evaporated. Subsequently, the mixture was cooled to room temperature with an average cooling rate of about 0.8° C./min. The mixture was screened, upon which a slurry of LDPE and cyclohexane was formed, in which no well-defined particles could be distinguished. Upon drying to the outside air a hard cake was formed.

EXAMPLE III 10 wt. % of a liquid additive (alkylamine ethoxylate, the product Atmer 163 supplied by ICI) was added to the product of Example I with gentle shaking. The additive was fully taken up within a few minutes, upon which granules were obtained that feel dry to the touch. Then, in 10% increments, more additive was added to this product. The maximum load upon which the product obtained still feels dry to the touch was 60 wt. %.

EXAMPLE IV

The gel particles obtained according to the process in Example I were now dried at a pressure of <100 mbar (<10$^4$ N/m$^2$) and a temperature setting of the stove of 35° C. To the product now obtained 5 wt. % of a liquid additive (alkylamine ethoxylate, the product Atmer 163 supplied by ICI) was added with gentle shaking. The additive was fully taken up within a few minutes, upon which granules were obtained that feel dry to the touch. Then, in increments of 5 wt. %, more additive was added to this product. The maximum load at which a product was obtained that still feels dry to the touch was 25 wt. %. This proves that the maximum load of particles dried at 35% is much lower than the maximum load of particles dried at room temperature.

EXAMPLE V

The gel particles of example I were now dried at a pressure of <100 mbar (<$10^4$ N/m$^2$) and a temperature setting of the stove of 50° C. To the product now obtained 5 wt. % of a liquid additive (alkylamine ethoxylate, the product Atmer 163 supplied by ICI) was added with gentle shaking. The additive was fully taken up within a few minutes, upon which granules were obtained that feel dry to the touch. Then, in increments of 5 wt. %, more additive was added to this product. The maximum load upon which a product is obtained that still feels dry to the touch was 10 wt. %.

The examples prove that the higher the temperature at which the particles are dried, the lower the maximum load can be.

We claim:

1. Process for the preparation of porous polyolefin particles, which process comprises the following steps:
1) dissolution of at least one crystallizable polyolefin in a solvent, which results in a solution being formed which comprises 0.1–50 wt. % (on the basis of the sum of the weight of the solvent and that of the polyolefin) polyolefin, and the initial polyolefin solution formed containing between 5 ppm and 20 wt. % (on the basis of the sum of the weight of the polyolefin and that of the nucleating agent) of nucleating agent,
2) dispersion of the resulting polyolefin solution in a non-solvent, at a temperature that is higher than the crystallization temperature of the polyolefin in the polyolefin solution, upon which a multiphase system is formed,
3) cooling of the multiphase system, with simultaneous stirring, the cooling rate being between 0.05 and 10° C./min, down to a temperature which is below the crystallization temperature of the polyolefin in the polyolefin solution, so that polyolefin-containing particles are formed,
4) separation of the polyolefin-containing particles from the liquid(s),
5) drying of the polyolefin-containing particles at a temperature that is below the crystallization temperature of the polyolefin in the initial polyolefin solution.

2. Process for the preparation of porous polyolefin particles, which process comprises the following steps:
1) dissolution of at least one crystallizable functionalized polyolefin in a solvent, which results in absolution being formed which comprises 0.1–50 wt. % (on the basis of the sum of the weight of the solvent and that of the functionalized polyolefin) functionalized polyolefin,
2) dispersion of the resulting polyolefin solution in a non-solvent, at a temperature that is higher than the crystallization temperature of the functionalized-polyolefin in the polyolefin solution, upon which a multiphase system is formed,
3) cooling of the multiphase system, with simultaneous stirring, the cooling rate being between 0.05 and 10° C./min, down to a temperature which is below the crystallization temperature of the functionalized-polyolefin in the polyolefin solution, so that functionalized-polyolefin-containing particles are formed,
4) separation of the functionalized-polyolefin-containing particles from the liquid(s),
5) drying of the functionalized-polyolefin-containing particles at a temperature that is below the crystallization temperature of the functionalized-polyolefin in the initial polyolefin solution.

3. Process according to either one of claims 1 or 2, characterized in that, before the multiphase system is cooled, a portion of the solvent is evaporated from the multiphase system formed.

4. Process according to either one of claim 1 or 2, characterized in that the polyolefin is a polyethylene.

5. Process according to claim 4, characterized in that the solvent is cyclohexane, n-hexane or n-heptane.

6. Process according to any one of claims 1 or 2, characterized in that the (functionalized) polyolefin concentration in the polyolefin solution is between 1 and 30 wt. % (on the basis of the sum of the weight of the solvent and that of the polyolefin).

7. Process according to claim 1, characterized in that a nucleating agent is present and the nucleating agent is chosen from the following compounds: silicates, mica, talc, sorbitol derivatives, saturated or unsaturated fatty acids or their salts, organic pigments, polyolefins with functional groups, or a combination of these.

8. Process according to claim 7, in which the nucleating agent is talc, a sorbitol derivative or an oxidized polyolefin.

9. Process according to claim 1, characterized in that the non-solvent is water, acetone, methanol, ethanol or a mixture of these compounds.

10. Process according to claims 1 or 9, characterized in that the non-solvent contains a surface-active agent.

11. Process according to any one of claims 1–10, characterized in that the multiphase system is subjected to cooling at a rate that is between 0.1 and 5° C./min.

12. Process according to claim 11, characterized in that the multiphase system is subjected to cooling at a rate that is between 0.2 and 2° C./min.

13. Process according to any one of claims 1, 2, 5, 7, or 9, characterized in that, upon drying under reduced pressure, the partial pressure of the solvent in the vapour phase is less than 20% of the standard vapour pressure of the solvent at 20° C.

14. Process according to claim 2 and 7, in which the functionalized polyolefin contains from 0,1 to 15 wt. % functional groups.

15. A concentrate, absorbent or carrier for substances that are to be released slowly or in a controlled manner comprised of porous polyolefin particles obtained according to the processes of claims 1, 2, 5, 7 or 9.

* * * * *